Jan. 20, 1959 W. H. HUNTLEY 2,869,354
KEY HOLDING DEVICE
Filed Nov. 3, 1953 4 Sheets-Sheet 1
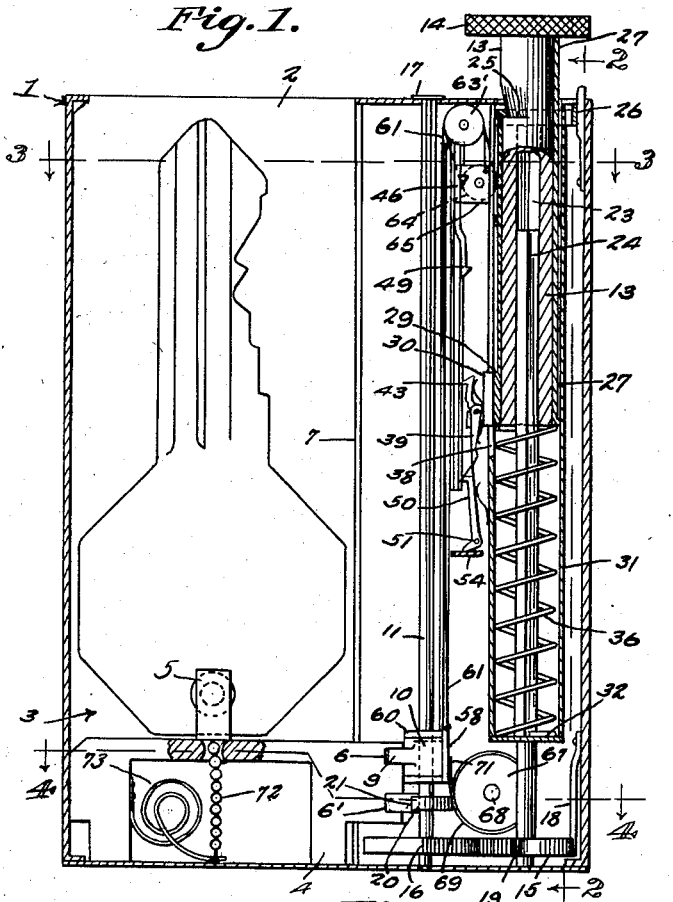
W. H. Huntley
INVENTOR
BY [signature]
ATTORNEYS.

Jan. 20, 1959　　　W. H. HUNTLEY　　　2,869,354
KEY HOLDING DEVICE
Filed Nov. 3, 1953　　　　　　　　　　　　4 Sheets-Sheet 2
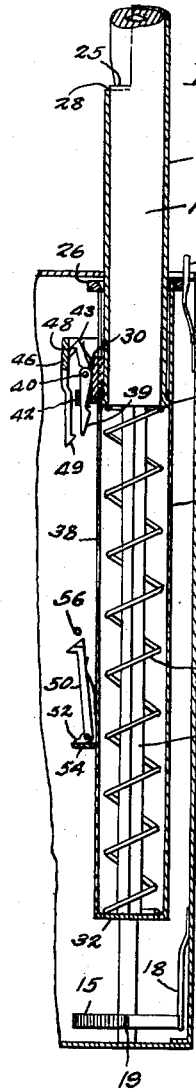
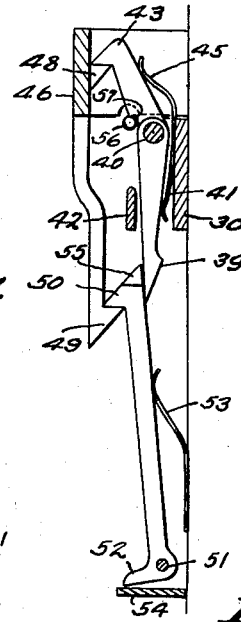
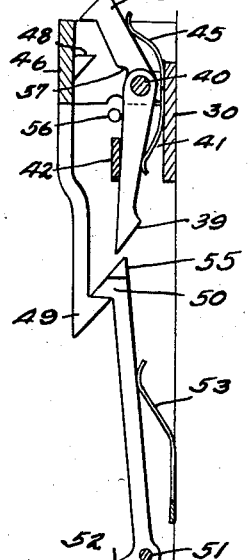
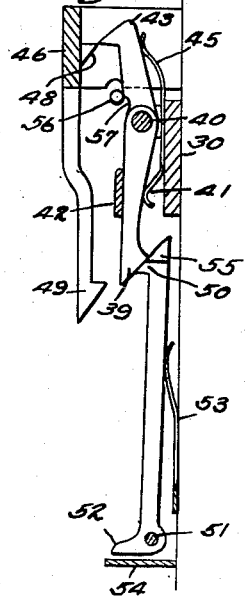
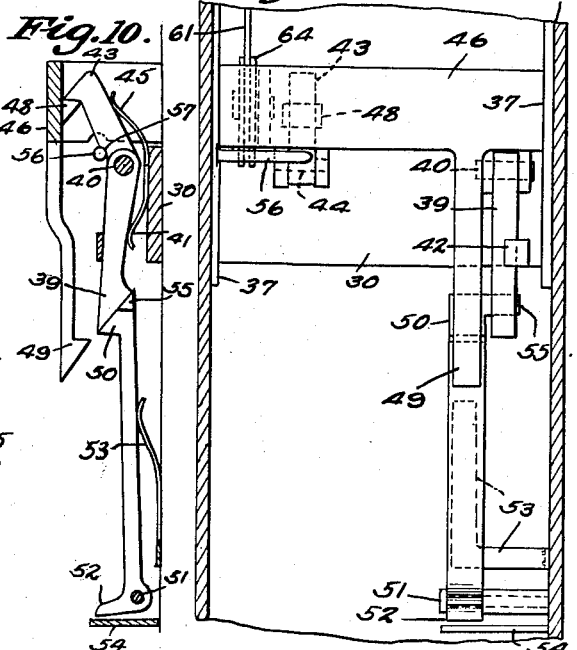
W. H. Huntley
INVENTOR
BY C. A. Snowsles.
ATTORNEYS.

Jan. 20, 1959     W. H. HUNTLEY     2,869,354
KEY HOLDING DEVICE
Filed Nov. 3, 1953     4 Sheets-Sheet 3
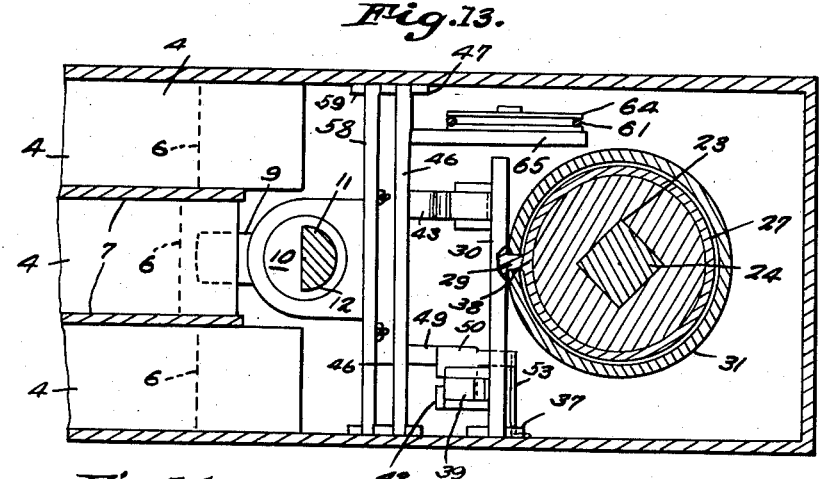
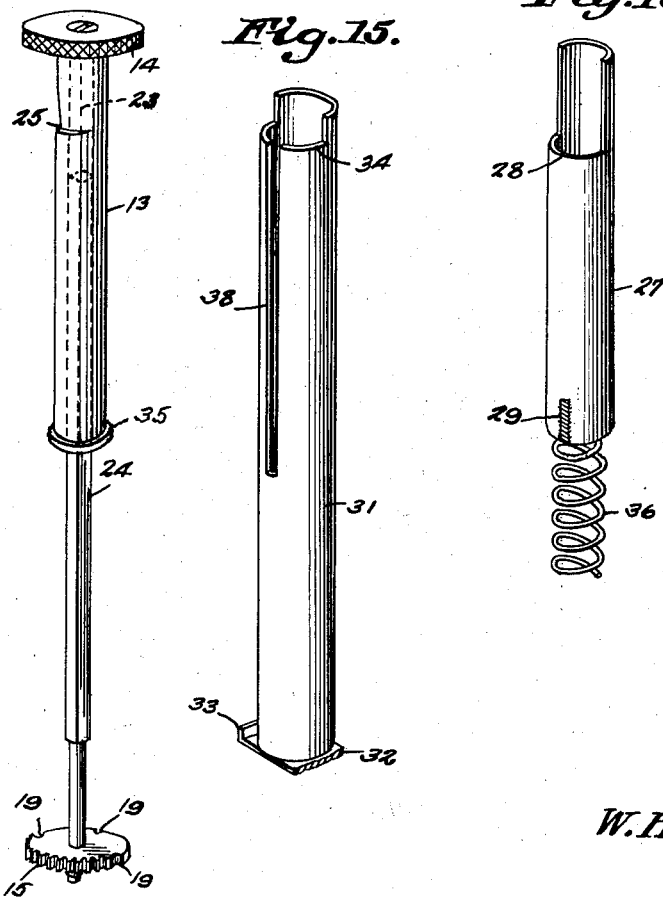
W. H. Huntley
INVENTOR
BY *Ca Snow &Co.*
ATTORNEYS.

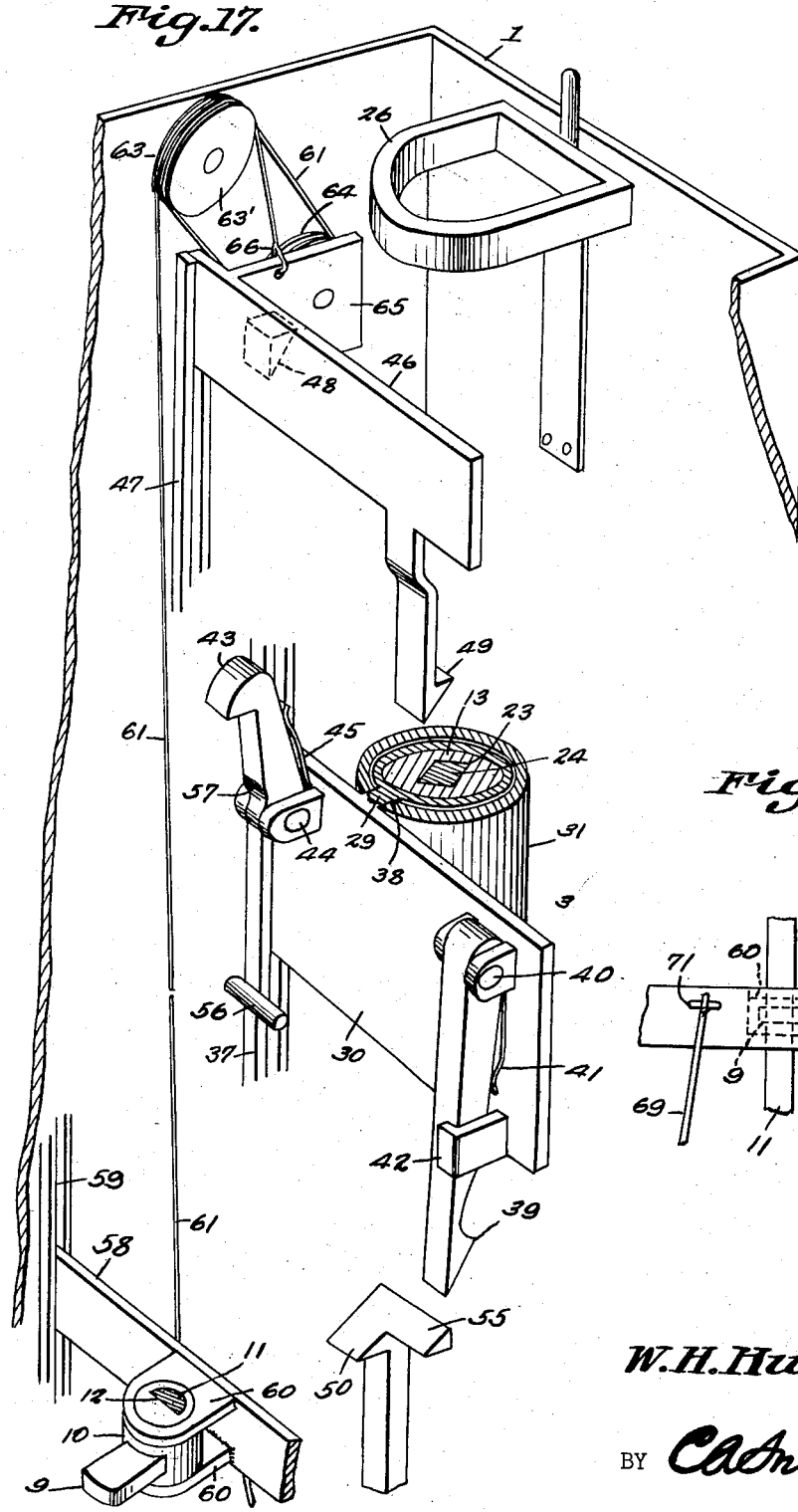

United States Patent Office 2,869,354
Patented Jan. 20, 1959

2,869,354

KEY HOLDING DEVICE

Walter Henry Huntley, Ben Lomond, Calif.

Application November 3, 1953, Serial No. 390,066

6 Claims. (Cl. 70—456)

This invention relates to a device for holding keys and has for its object the provision of a case for housing keys, which is small in size and attractive in appearance.

Another object of the invention is the provision of mechanism for the preselection of the key to be used, and the ejection of the preselected key from the case.

A still further object of the invention is the provision of means for retracting the key to its original storage position within the case.

Another object of the invention is the provision of mechanism for selecting and withdrawing the particular key desired for use, and means for preventing accidental movement of the rest of the keys, from the case.

With these and other objects in view, as will appear from the description, and which will be particularly pointed out in the appended claims, the invention resides in the combination and arrangement of parts hereinafter described, it being understood that the changes may be made in the structure disclosed, within the scope appended claims without departing from the spirit of the invention, or sacrificing any of the advantages thereof.

In the drawing forming a part of this specification:

Figure 1 is a view in side elevation, partly in section, of the preferred embodiment of the invention.

Fig. 2 is a view in sectional elevation of the device, the section being taken on line 2—2 of Fig. 1.

Fig. 3 is a plan sectional view taken on line 3—3 of Fig. 1.

Fig. 4 is a plan sectional view taken on line 4—4 of Fig. 1.

Fig. 5 is a top plan view of the device.

Fig. 6 is a sectional view of a portion of the operating mechanism showing the parts in the position occupied at the first step in ejecting the key for use.

Figs. 7, 8, 9, 10 and 11 are fragmentary views of a portion of the latching mechanism showing the same in progressive steps in sequence through one cycle of operation.

Fig. 12 is a rear elevation of the structure depicted in Fig. 10.

Fig. 13 is a plan view partly in section, drawn to an enlarged scale of a part of the device.

Figs. 14, 15 and 16 show in perspective the parts of the plunger mechanism.

Fig. 17 is a view in diagrammatic perspective of the ejecting and retracting mechanism.

Fig. 18 is a rear view of one of the slidable plates.

Referring to the drawings by characters of reference the numeral 1 indicates a case of any desirable material, preferably metal or plastic. The case is divided by partitions 2, into a plurality of compartments 3, in the drawings there being three compartments shown. Each compartment has mounted therein for vertical slidable movement, a block 4, the blocks 4 providing key holding and guiding members. Each block has secured thereto key-retaining means designated 5. Notches 6 and 6' traverse the blocks at the rear surface, near the top and bottom respectively, thereof. The blocks 4 carrying the several keys are guided out of the case for use, and returned thereto by means of guide strips 7 secured to the case. These strips project into slots 8 formed in one side of each block.

The means for selecting the key to be withdrawn comprises a tongue 9 which projects from a movable carrier 10. The tongue 9 is adapted to be moved into one of the notches 6 in the blocks 4 carrying the key to be withdrawn for use.

A D-shaped or half-round shaft 11 pivoted at its ends in the top and bottom of the case passes through a D-shaped opening 12 in the carrier 10. A plunger 13 provided with a turning cap 14 is mounted for partial rotation adjacent the shaft 11. The plunger or shaft 13 is a two-part member having a polygonally-shaped bore 23 therethrough in which is mounted a shaft 24, the shaft and the bore having like cross-sectional shapes. The shaft 24 carries near its lower end a gear 15, the teeth of which mesh with the teeth of a gear 16 on the shaft 11. An indicator 17 on the shaft 11 points out the key which has been selected to be moved out of the case. This pointer is operated by manual rotation of the cap 14 on the shaft 13, and through the gears 15 and 16 move the indicator, in the present showing, to one of three positions. A stop latch 18 is positioned adjacent the rim of the gear disc 15 and engages any one of the notches 19 formed in the gear 15, each notch corresponding to its respective block 4, temporarily holding the above described parts of the extracting mechanism in the position to which they have been adjusted.

The means for preventing accidental displacement of the key retaining blocks 4 consist of a disc 20 secured to the shaft 11, the disc being partially cut away to provide a straight edge 21 at one side thereof and a circular portion at the other side. Attention is directed to Fig. 4. As shown in this figure the central block 4 extends close to the cut-away portion 21 of the disc 20, whereas the outer blocks 4 at both sides of the center block extend beyond the center block and overlie a portion of the disc 20 within the slots 6', as shown by dotted lines in Fig. 4. It will be noted that when rotated, the disc 20 is so located as to pass through the notches 6' in all of the blocks 4. In this way the disc 20 serves to retain within the case, the keys that are not to be used.

As shown in Fig. 4, the center key may be ejected by manipulation of the ejecting mechanism, the keys on the sides thereof being held in the case by reason of the overlying portions of the disc 20 within the notches 6'. Likewise when one of the side keys is to be withdrawn, the center block and the other side block are engaged by the disc 20 to prevent accidental exit of keys carried by their respective blocks. It will be seen that when the indicator is moved to point to either of the three keys the disc 20, is at the same time moved to retain the other two keys in the case.

The projection and return to the case of the key desired for use, is accomplished by the mechanism now to be described. As hereinbefore stated the shaft 13 comprises two parts, the upper portion 13 which is provided with a central polygonal-shaped bore 23 and a correspondingly shaped shaft 24, on which the portion 13 vertically slides. A latch engaging shoulder 25 is formed near the top of the shaft or plunger 13, to be engaged by a thumb latch 26 for a purpose to be presently described. A sleeve 27 surrounds the shaft 13, a section 28 at the upper end of the sleeve being cut away to provide clearance for the latch 26. A tongue 29 is attached permanently to the sleeve 27 and carries a vertically slidable latch plate 30, on which is mounted latch mechanism to be presently described. The shaft 13 and its encircling sleeve 27 are mounted for vertical sliding movement in a barrel 31 which is secured at its lower end to a cross bar 32, the cross bar being permanently secured to the sides of the case by flanges 33. The barrel extends to the top of the case where it is secured to the case. A portion of the barrel 31 is cut away at 34, similar to the portion 28 in the tube 27 and for the same purpose, to provide clearance for the latch 26. A stop ring 35 is formed at the lower end of the plunger 13 to check the plunger in its upward movement under the influence of a compression spring 36 interposed between the bar 32 and the lower end of the sleeve 27 and plunger 13. The plate 30 is mounted in guide strips 37 on the side of the case and a slot 38 in the barrel 31 permits limited up and down movement of the lug 29 therethrough.

A latch 39 pivotally mounted at 40 on the plate 30 has a spring 41 which urges the latch away from the plate 30 into contact with a stop 42. A second latch 43 is pivotally mounted at 44 on the plate 30, as shown by Fig. 17. A spring 45 normally biases the latch 43 towards the lug or keeper 48. The purpose of the latches 39 and 43 carried by the plate 30 will presently appear. Another slide plate 46 is mounted for vertical movement in guides 47. The plate 46 has secured thereto a lug 48 located thereon in position to engage the latch 43, this plate also carrying an arm on which lug 49 is formed for engagement with an elongated latch 50, pivotally mounted on the case at 51. A foot 52 on the latch serves as a stop for the latch against the action of the spring 53, the foot contacting a shelf 54 projecting from the side of the case. A lug 55 projects from the top of the latch 50, to one side thereof in the path of the cam 39 in its downward movement.

A pin 56 permanently fixed in one side of the case is located in the path of the latch 43. A cam surface 57 on the latch rides over the pin 56 to release the latch from its engagement with the lug 48.

A slide plate, distinguished from the other plates as an ejector carrying plate 58, is mounted in guides 59 for vertical sliding movement. The plate 58 has ears 60 secured thereon in which the carrier 10 is mounted for pivotal movement, the carrier being moved thereby for vertical travel with the plate 58. A cable 61 is secured to the plate 58 at 62, from whence it is trained over a sheave 63, one of a pair of sheaves being pivotally secured to the case near its top. The cable is then led over a single sheave 64 mounted on a rearwardly extended arm 65 of the plate 46. The cable is then led over a second sheave 63' of the pair of sheaves and terminates at 66 in a connection to the arm 65.

A spring retaining barrel 67 mounted on a shaft 68 secured to the case near the lower end thereof, has a flexible element 69 secured to the spring barrel. The opposite end of the element 69 is connected to the slide plate 58 at 71. The spring barrel and its connection to the slide 58 is adapted to place the element 69 under tension at all times, thus returning and retaining the key presently used to its position within the case.

Manipulation of the container is as follows: All parts are shown in normal operating position in Fig. 1, with the spring 36 compressed between the cross bar 32 and the slide members 13 and 27. The latch 26 having engagement with the notch 25 retains the members 13 and 27 in the position shown in Fig. 1. When a key is to be selected for projection from the case, the indicator 17 is moved through the instrumentality of the knob 14, the shaft 24, the gears 15 and 16 and the shaft 11, to point out on the index the particular key to be ejected or withdrawn. Movement of the shaft 11 results in a corresponding movement of the carrier 10 to place the lug 9 in the slot 6 of the block 4 carrying the key to be used, the disc 20 being likewise moved to a position in the slots 6', to retain the other keys in the case. The latch 18 engaging the notch 19 temporarily retains the selecting parts in position. Pressure applied to the back of the latch 26 releases the shaft or plunger 13 and the sleeve 27 with its attached plate 30, to the action of the spring 36 and the parts are elevated to the position shown in Fig. 6. As shown in this position the latch 43 engages the lug 48, so that upon manual return of the plunger to its normal or first position, the plate 46 will be carried downwardly, and through the multiplying action of the pulleys 63, 63' and 64, the short travel of the plunger is converted into movement sufficient through the flexible element 61 to lift the slide 58 with its attendant parts for elevating the selected block 4 and the key attached thereto to a position above the case, to be grasped for use.

The key is attached to the block 4 by a clip 5 coupled to the key. A chain 72 is connected to the clip and to a light coil spring 73, one end of the spring being secured to the block. With the flexible connection with the block, the key may be readily handled upon ejection from the case and loss or misplacement avoided. Downward movement of the plunger, to eject the key, is limited by the lug 29 reaching the bottom of the slot 38. At this point in the operation, Fig. 8 shows the position of the latching member in which the lug 49 and latch 50 are in holding position and remain so during use of the key. It will be seen that upon arrival at this position the latch 39 is located to the right of the lug 55, as viewed in Fig. 8. It will also be understood that the notch 25 on the plunger 13 has been moved below the latch 26. Thus when manual pressure on the plunger is removed the plunger will be forced upwardly by the spring 36 causing the latch 26 to engage the notch 25 and the parts will then be in the position shown in Fig. 9. It will be seen that the latch 39 has been forced by the spring 41 to a position with its point to the left of the lug 55. After use of the key, and its return to the case is desired, a short downward thrust on the plunger results in the cam on latch 39 disengaging the latch 50 from the lug 49, as shown in Fig. 10, and engagement of the cam 57 and pin 56 to also disengage the latch 43 from the pawl 48, as shown in Fig. 11, whereupon the key will be retracted by the spring 67, into the case and the parts automatically returned to the position shown in Fig. 1, ready for the next use of the key.

Having thus described the invention, what is claimed is:

1. A key container comprising a case having compartments, a slidable block in each compartment, a carrier mounted for slidable movement adjacent the blocks, a lug on the carrier adapted to engage a selected block, means for elevating the selected block comprising a plunger mounted for reciprocation in the case, a flexible element connecting the carrier with the plunger whereby downward movement of the plunger through the flexible element moves the block and carries it upwardly in the case, and means for returning the carrier and the block to normal position within the case.

2. A key container comprising a case having compartments, a key holding block mounted in each compartment for movement longitudinally of its compartment, means for securing keys to said key holding blocks each key holding block having notches formed in one edge thereof, a carrier movable longitudinally of said case, a tongue extending laterally from said carrier, mechanism for moving said carrier for effecting movement of said tongue into a notch of a selected key holding block, selecting a particular key holding block for moving a key from said case, a train of pulleys mounted within said case, a cable operating over said pulleys, one end of said cable being connected to said carrier, a plunger mounted for longitudinal sliding movement within said case, the other end of said cable being secured to said plunger effecting movement of said carrier and a selected block for ejecting a key from said case, when said plunger is forced downwardly, and mechanism for returning said carrier and holding block to their normal positions within said case.

3. A key container as claimed in claim 2, and chains connected to said keys, and coiled springs connected between said chains and their key holding blocks, normally biasing said keys into contact with their key holding blocks.

4. A key container comprising a case having a plurality of compartments, each compartment having a key retaining block therein, mechanism for selecting a specific key for use, said mechanism including a rotatable shaft, a carrier mounted on said shaft for longitudinal movement thereover, a projection on said carrier for engagement with a selected key block, mechanism for elevating said carrier and selected block and key to a position for use, and mechanism for lowering the block in said case.

5. A key container having a compartment, a plate including a stationary arm mounted within said container, a key retaining block slidably mounted in the compartment, a spring-actuated plunger mounted for reciprocal movement in said container, a thumb latch in engagement with said plunger for retaining the plunger within the container against the action of said spring and for releasing the plunger, a slide plate mounted for longitudinal movement within the container, a carrier on said plate, a lug extending from said carrier for engaging the block, a flexible connector attached at one of its ends to said slide plate, the other end of said connector being attached to said stationary arm for elevating the block in the compartment when moved in one direction, and means for returning the block to its first position.

6. In a key container, a case having a plurality of compartments, a key retainer block in each compartment, each block having a notch in one edge thereof, means for selecting an individual key retainer block, comprising a shaft, means for effecting manual rotation of said shaft, a second shaft mounted in the case parallel to the first mentioned shaft, meshing gears on the two shafts, a slide plate mounted for reciprocal movement in the case, a carrier rotatable with and slidable longitudinally of the second shaft, mounted on said slide plate for oscillatory movement, a tongue on the carrier adapted to move into a notch of a selected key retaining block upon rotation of said second shaft, mechanism for advancing the carrier to a position at the top of the case from which position a key connected with the key retaining block may be used, and means for returning the carrier to its normal position within the case.

References Cited in the file of this patent

UNITED STATES PATENTS

| | | |
|---|---|---|
| 1,649,514 | Del'eau | Nov. 15, 1927 |
| 2,008,398 | Mangan | July 16, 1935 |
| 2,076,895 | Johnston | Apr. 13, 1937 |
| 2,490,396 | Leff | Dec. 6, 1949 |